United States Patent
Huang et al.

(10) Patent No.: US 10,424,059 B2
(45) Date of Patent: Sep. 24, 2019

(54) QUALITY EVALUATION

(71) Applicant: INTERNATIONAL BUSINESS MACHINES CORPORATION, Armonk, NY (US)

(72) Inventors: Jing Chang Huang, Shanghai (CN); Jun Zhu, Shanghai (CN); Jun Chi Yan, Changning (CN); Guo Qiang Hu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/700,259

(22) Filed: Sep. 11, 2017

(65) Prior Publication Data

US 2019/0080443 A1    Mar. 14, 2019

(51) Int. Cl.
| | |
|---|---|
| *G06K 9/00* | (2006.01) |
| *G06T 7/00* | (2017.01) |
| *G06K 9/46* | (2006.01) |

(52) U.S. Cl.
CPC .............. *G06T 7/001* (2013.01); *G06K 9/46* (2013.01); *G06T 2207/30121* (2013.01)

(58) Field of Classification Search
CPC ............ G06T 7/0004; G06T 7/001; G06T 2207/30148; G06T 2207/30121; G06K 9/46; G02F 1/136259

See application file for complete search history.

(56) References Cited

U.S. PATENT DOCUMENTS

| | | | | |
|---|---|---|---|---|
| 2005/0146714 | A1* | 7/2005 | Kitamura | G06K 9/00 356/237.2 |
| 2007/0288219 | A1* | 12/2007 | Zafar | G03F 1/84 703/14 |
| 2008/0306701 | A1* | 12/2008 | Zhong | G06T 7/0004 702/81 |

(Continued)

FOREIGN PATENT DOCUMENTS

| | | |
|---|---|---|
| CN | 103218961 A | 7/2013 |
| CN | 103913461 A | 7/2014 |

(Continued)

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

(Continued)

*Primary Examiner* — Bhavesh M Mehta
*Assistant Examiner* — Ian L Lemieux
(74) *Attorney, Agent, or Firm* — Jordan T. Schiller

(57) ABSTRACT

Implementations of the present disclosure relate to methods, systems, and computer program products for quality evaluation. In one implementation, a computer-implemented method is disclosed. In the method, a pattern period may be extracted from an image of a target object, the pattern period indicating a period of a pattern that is repeated in the image. A reference image may be generated by repeating the pattern based on the extracted pattern period. Quality of the target object may be evaluated by comparing the generated reference image and the image of the target object. In other implementations, a computer-implemented system and a computer program product for quality evaluation are disclosed.

14 Claims, 7 Drawing Sheets

(56) References Cited

U.S. PATENT DOCUMENTS

| | | | | |
|---|---|---|---|---|
| 2011/0075937 A1* | 3/2011 | Tate | .................. | G06K 9/3275 |
| | | | | 382/218 |
| 2014/0312351 A1* | 10/2014 | Shiomi | ............... | H01L 27/124 |
| | | | | 257/72 |
| 2015/0139530 A1* | 5/2015 | Lavole | .................. | G06T 7/70 |
| | | | | 382/149 |
| 2016/0364849 A1 | 12/2016 | Liu et al. | | |

FOREIGN PATENT DOCUMENTS

| | | |
|---|---|---|
| CN | 103913468 A | 7/2014 |
| CN | 104678600 A | 6/2015 |
| CN | 105607312 A | 5/2016 |

OTHER PUBLICATIONS

Mei et al., "Unsupervised-Learning-Based Feature-Level Fusion Method for Mura Defect Recognition," IEEE Transactions on Semiconductor Manufacturing, vol. 30, No. 1, Feb. 2017, pp. 105-113.

\* cited by examiner

QUALITY EVALUATION

BACKGROUND

The present disclosure relates generally to product quality control. Specifically, the present disclosure relates to methods, systems, and products for evaluating quality of a target object.

Nowadays, Liquid Crystal Device (LCD) is getting more popular in almost all types of digital devices with displays. For example, mobile phones, pads, monitors, notebooks, and the like are equipped with LCD displays having various sizes and resolutions. The LCD display is manufactured from a plurality of layers such as a polarizing filter layer, a Thin Field Transistor (TFT) layer and the like. However, during the manufacturing procedure, defects may occur in each of these layers. At this point, how to evaluate whether a layer is qualified in a fast and convenient way becomes a focus.

SUMMARY

In one aspect, a computer-implemented method is disclosed. According to the method, a pattern period may be extracted from an image of a target object, where the pattern period indicates a period of a pattern that is repeated in the image. A reference image may be generated by repeating the pattern based on the extracted pattern period. Quality of the target object may be evaluated by comparing the generated reference image and the image of the target object.

In another aspect, a computer-implemented system is disclosed. The computing system comprises a computer processor coupled to a computer-readable memory unit, where the memory unit comprises instructions that when executed by the computer processor implements a method. According to the method, a pattern period may be extracted from an image of a target object, where the pattern period indicates a period of a pattern that is repeated in the image. A reference image may be generated by repeating the pattern based on the extracted pattern period. Quality of the target object may be evaluated by comparing the generated reference image and the image of the target object.

In another aspect, a computer program product is disclosed. The computer program product comprises a computer readable storage medium having program instructions embodied therewith. The program instructions are executable by an electronic device to cause the electronic device to perform actions of: extracting a pattern period from an image of a target object, the pattern period indicating a period of a pattern that is repeated in the image; generating a reference image by repeating the pattern based on the extracted pattern period; and evaluating quality of the target object by comparing the generated reference image and the image of the target object.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
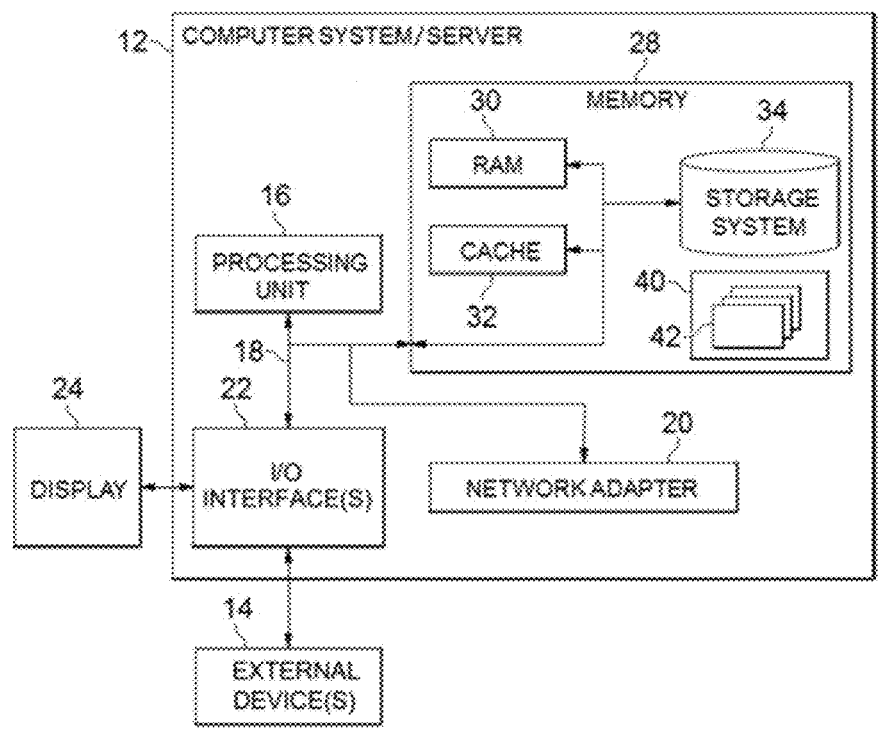
FIG. 1 depicts a cloud computing node, according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g. country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g. storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g. web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g. host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g. mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
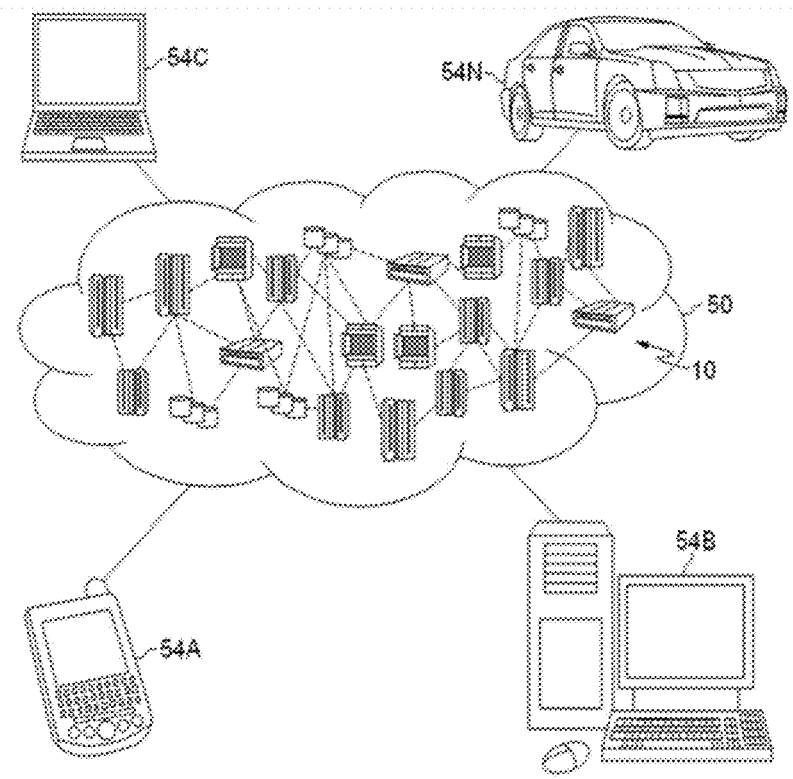
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
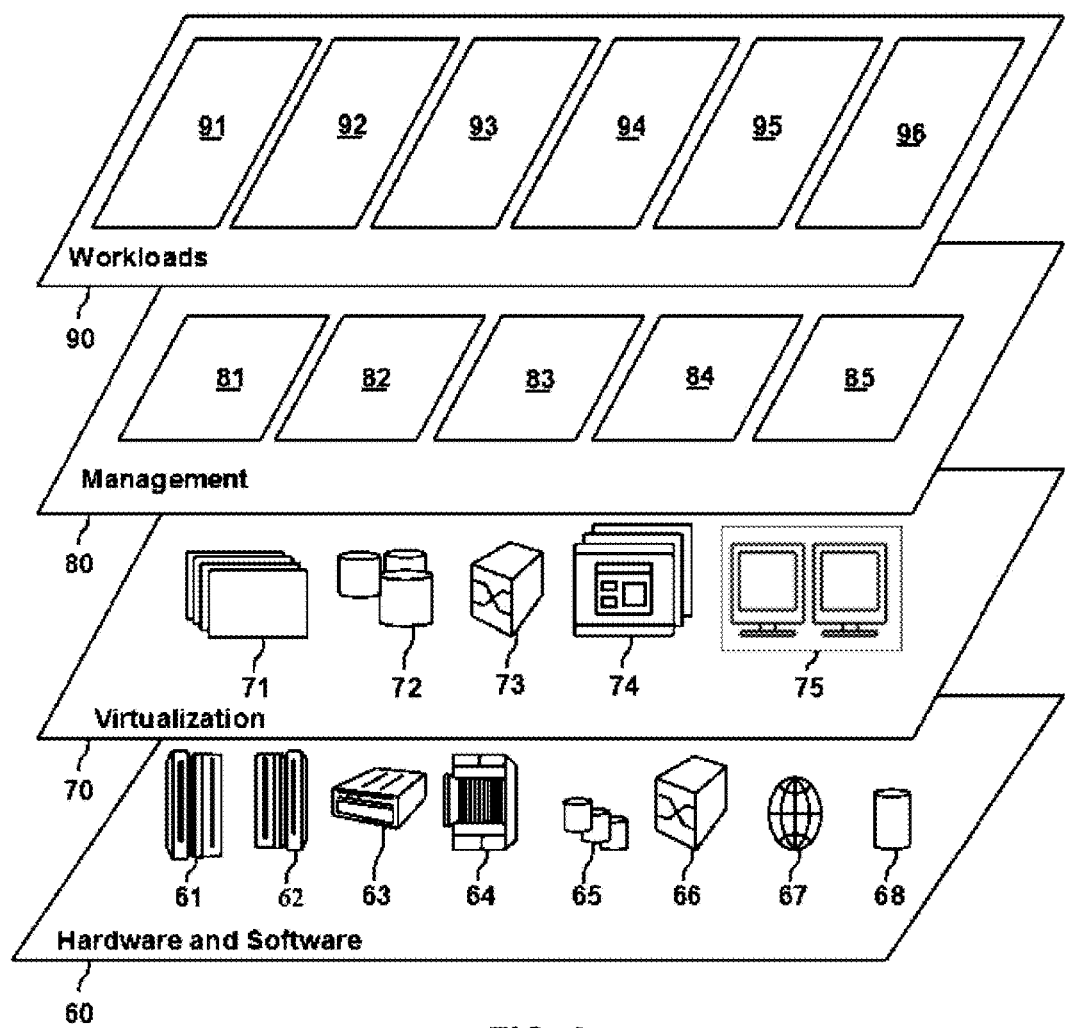
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and quality evaluation processing 96. Hereinafter, reference will be made to FIGS. 4 to 11 to describe details of the quality evaluation processing 96.

Usually, elements in each layer for building the LCD are closely related to pixels in the LCD, and then each layer may include a great number of tiny elements. Taking a TFT object as an example of a layer for building the LCD, sizes of the elements in the TFT object result in the inability to directly detect the quality of the TFT object. Instead, a high-resolution microscope camera may be used to take photos of the TFT object, and then examinations may be made to the photos so as to evaluate the quality of the TFT.

There have been provided several approaches in the field of quality evaluation. According to one approach, those photos may be manually checked by human eyes. On one hand, this approach results in significant manpower and time overhead, and thus the number of the manufactured LCD is heavily dependent on the qualified TFT objects approved by the human check. On the other hand, the accuracy of the human eyes is not high enough to ensure that the TFT objects that have passed the human check are really qualified ones.

According to another approach, a classifier such as a deep learning network may be trained to identify the qualified/unqualified objects. However, this kind of classifier depends on the historical knowledge and should involve considerable training datasets. Accordingly, the classifier cannot handle new defect types and retraining is required based on new training datasets, such that the retrained classifier may deal with the new defect types. Further, this approach can only identify qualified and unqualified objects without the ability of identifying a location of the defect in the unqualified object.

For the sake of description, implementations of the present disclosure will be described by taking a TFT object as an example of a target object that is to be evaluated. In the context of the present disclosure, the target object may be a flat object such as any layer for building the LCD display. For example, the target object may be selected from a group including any of a polarizing filter film, a color filter film, a liquid film, a thin field transistor film, a diffuser film, a backlight film, a back substrate, and so on.

Figure 4:
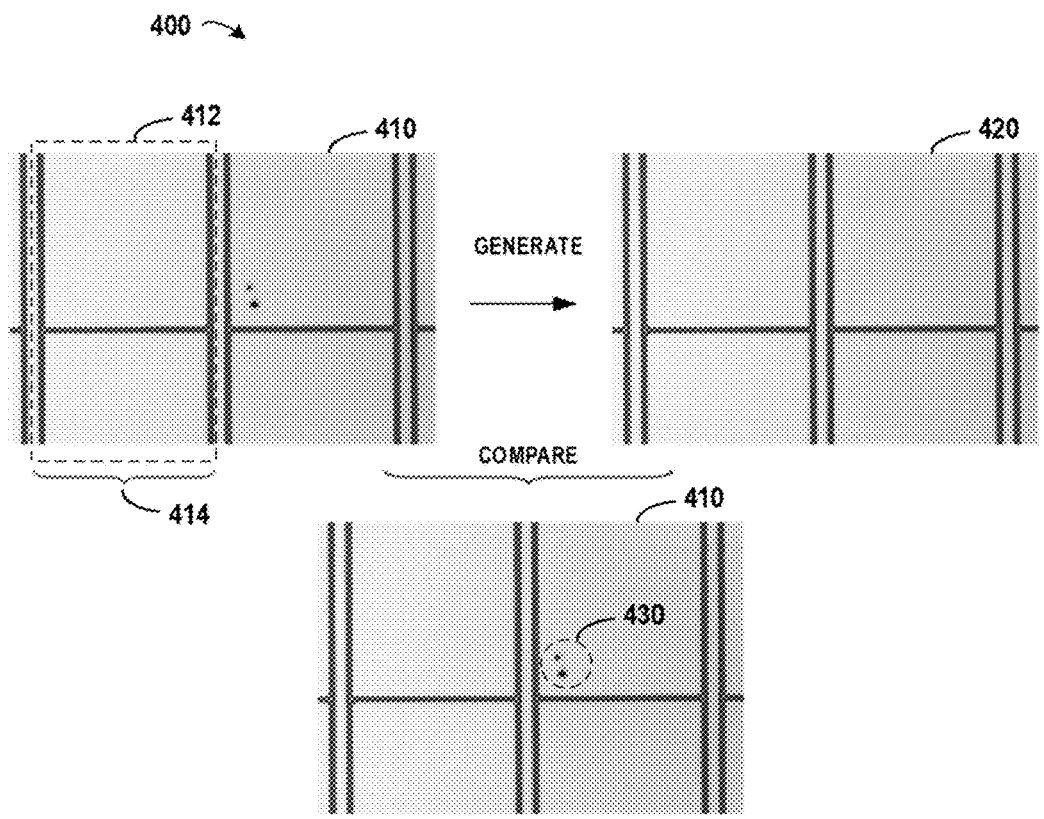
FIG. 4 depicts an example diagram for evaluating quality of a target object, according to one implementation of the present disclosure.

In order to at least partially solve the above and other potential problems, a new method for quality evaluation is disclosed according to implementations of the present disclosure. Hereinafter, reference will be made to FIG. 4 for a general description of the present disclosure. FIG. 4 depicts an example diagram 400 for evaluating quality of a target object according to one implementation of the present disclosure. Reference will be made to an image 410 which is an image that is generated from a TFT object by, for example, a high-resolution microscope camera. Like other raw materials for building the LCD display, the TFT object has periodic appearances such as repeated patterns including vertical and horizontal lines, as shown in FIG. 4. Due to natures of the pixels in the LCD display, repeated patterns appear in almost all the layers for building the LCD.

In the implementation of the present disclosure, the periodic information may be utilized for defect detection. It is to be understood that the image 410 is just an example image of a target object, where the portion in the dash block shows one of the repeated pattern 412 with a pattern period 414. Although only two patterns are included in the image 410, in another example, the image 410 may include more patterns. Once the pattern period 414 and the pattern 412 are extracted from the image 410, a reference image 420 may be generated by repeating the pattern 412 based on the pattern period 414.

Usually, the microscope camera for shooting the image 410 has a basic function of placing defects in the TFT object to a central area of the image 410. At this point, if the pattern 412 is selected from an area that is away from the center of the image 410, then it is very likely that the selected pattern 412 may be a clean pattern free of any defect. As the pattern 412 is clean and has no defect, the reference image 420 that is generated by repeating the clean pattern 412 may be a clean background for further comparison.

Next, the image 410 may be compared with the reference image 420 to see if there is any difference between the two images 410 and 420. Based on the comparing result, the quality of the target object may be evaluated. Specifically, if there is no difference between the two images, it may indicate that the target object is qualified; otherwise, it may indicate that there might possibly be one or more defects (as illustrated in a circle 430) within an area corresponding to the detected difference.

The above implementation may provide a much flexible and convenient way for quality evaluation. With this implementation, no human interaction will be involved in the procedure of the evaluating, and each of the above steps may be performed in an automatic manner. Meanwhile, the comparison between the image 410 and the reference image 420 may be based on each and every pixel, and thus the accuracy of the comparison may assure that the quality evaluation is much more reliable than a human check. Further, the present implementation does not need historical knowledge for the training. Instead, even if only one image 410 is provided, a pattern 412 may be determined from the surrounding portions of the image 410. By repeating the pattern 412, the clean reference image 420 may be generated and severed as the base for the comparison.

Figure 5:
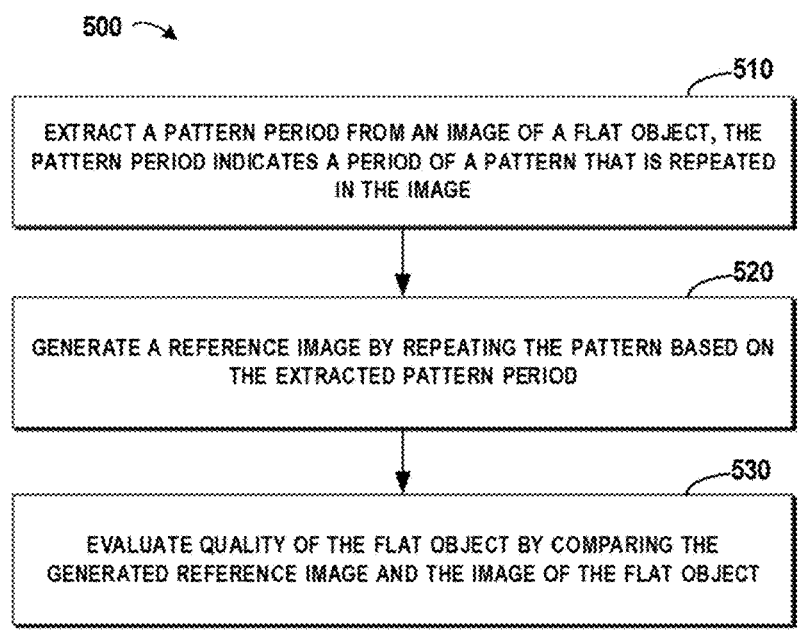
FIG. 5 depicts an example flowchart of a method for evaluating quality of a target object, according to one implementation of the present disclosure.

The above paragraphs have provided the general description of the present disclosure, further reference will be made to FIG. 5 for the detailed steps of the quality evaluation. FIG. 5 depicts an example flowchart of a method 500 for evaluating quality of a target object according to one implementation of the present disclosure. As shown in FIG. 5, a pattern period 414 may be extracted 510 from the image 410 of a target object, here the pattern period 414 may indicate a period of a pattern that is repeated in the image 410. Once the pattern period 414 is determined, a pattern 412 may be selected from the surrounding portions that are away from the center of the image 410 so as to excluding defects into the pattern 412. For example, the pattern 412 may start at a location near the left boundary of the image 410 to ensure that the pattern 412 is clean.

In this implementation, the pattern period 414 is illustrated along the horizontal direction, and the pattern 412 is a sub-image with a height of a full height of the image 410 and a width of the pattern period 414. In another implementation, the pattern period 414 may be determined along a vertical direction, such that the pattern 412 is a sub-image having a width of a full width of the image 410 and having a height of the pattern period 414.

Based on the extracted pattern period 414, a reference image 420 may be generated 520 by repeating the pattern 412. Continuing the above example, if the pattern period 414 is along the horizontal direction, then the pattern 412 may be also repeated along the horizontal direction. Alternatively, if the pattern period 414 is along the vertical direction, then the pattern 412 may be also repeated along the vertical direction.

Further, the quality of the target object may be evaluated 530 by comparing the generated reference image 420 and the image 410 of the target object. As the reference image 420 indicates an ideal image without a defect, the difference between the image 410 and the reference image 420 may indicate the defect(s) in the target object.

Figure 6:
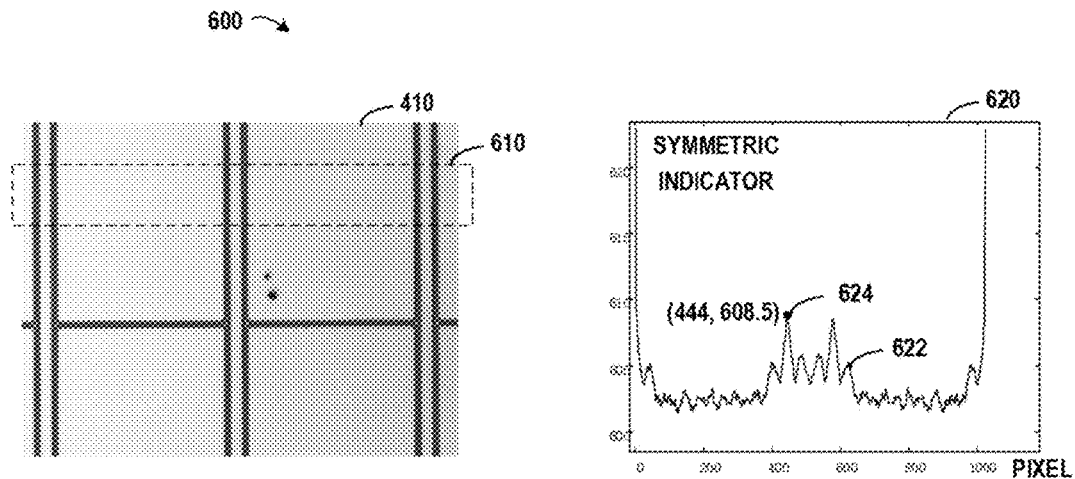
FIG. 6 depicts an example diagram for extracting an initial period by a symmetric analysis to the image, according to one implementation of the present disclosure.
Figure 7:
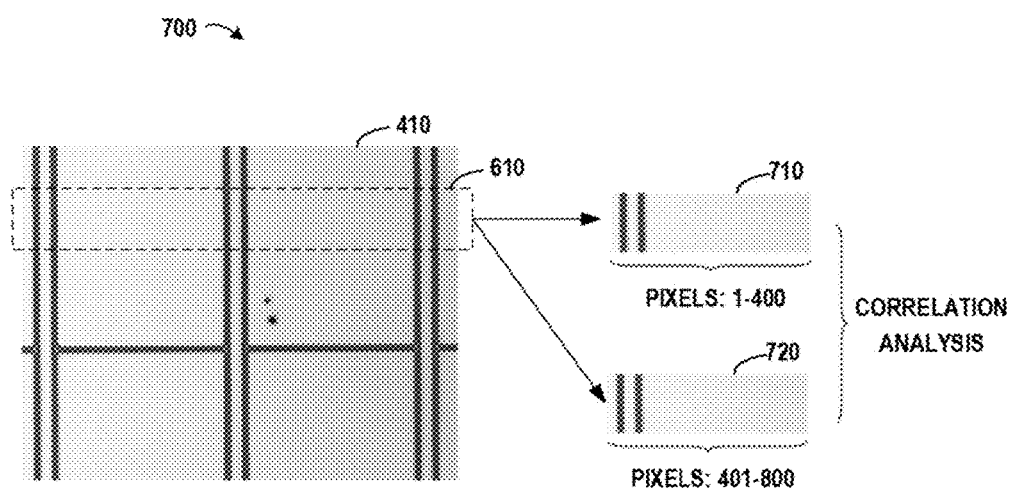
FIG. 7 depicts an example diagram for refining the initial period based on a correlation analysis associated with the initial period, according to one implementation of the present disclosure.

In one implementation of the present disclosure, an initial period may be obtained by a symmetric analysis to the image, and then the initial period may be refined based on a correlation analysis associated with the initial period so as to obtain the pattern period 414. Reference will be made to FIGS. 6 and 7 for the symmetric analysis and the correlation analysis, respectively.

FIG. 6 depicts an example diagram 600 for extracting an initial period by a symmetric analysis to the image according to one implementation of the present disclosure. According to FIG. 6, an area 610 may be selected from the image 410, based on which a Symmetric Average Magnitude Sum Function (SAMSF) may be performed. Here, the height of the area 610 may be set to a value that is less than or equals to the full height of the image 410, and the width of the area 610 may be set to the full width of the image 410. Supposing a resolution of the image 410 is 1024*768, the resolution of the area 610 may be set to, for example, 1024*200.

With the SAMSF, the image 410 may be processed and then a graph 620 may be generated. In the graph 620, the x axis indicates the pixel with a maximum of 1024, and the y axis indicates a symmetric indicator determined from the SAMSF, and the amplitude of the symmetric indicator may be set according to the definition of the SAMSF. A curve 622 represents the symmetric indicator corresponds to the pixels in the image 410. Here, the curve 622 is of a symmetrical shape and thus the left portion (or the right portion) of the curve 622 may be considered for determining the initial period.

Referring to the curve 622, there is a peak 624 with the values of (444, 608.5) in the left portion of the curve 622, where the x value of the peak 624 may represent a rough value of the period. At this point, the peak 624 may indicate that a precise value of the pattern period 414 may fall within a range near the value "444." In other words, the pattern period 414 may be about 444 pixels. Accordingly, the initial period may be set to 444 for further processing. Although the above paragraphs have described how to determine the initial period from the peak 624 resulting from the SAMSF, the SAMSF is only an example method for symmetric analysis and other methods may be adopted in another implementation.

Further, reference will be made to FIG. 7 for describing details of the correlation analysis. FIG. 7 depicts an example diagram 700 for refining the initial period based on a correlation analysis associated with the initial period according to one implementation of the present disclosure. In this implementation, a range near the initial period may be set for the correlation analysis. For example, an offset such as "44" may be predefined for the initial period. In another example, another value in pixel or a certain percentage (such as 10%) may be predefined as the offset. Supposing the offset is set to 44, then the range may be defined as [400, 488].

In one implementation of the present disclosure, a current period may be selected from a range associated with the initial period, and then a first sub-image and a second sub-image may be determined by dividing the image 410 with the current period. Further, the current period may be identified as the pattern period 414 in response to a correlation occurring between the first sub-image and second sub-image.

The correlation analysis may be performed in several rounds of processing. Referring to FIG. 7, two sub-images 710 and 720 may be extracted from the area 610 according to a current period selected from the range [400, 488]. Supposing the width of the image 410 is 1024, the pixels along the width are labelled with numbers from 1 to 1024, and the current period is set to 400 in the first round, then the width of the sub-image 710 may be associated with the pixels from 1 to 400. Further, the sub-image 720 follows the sub-image 710 and may be extracted from the area 610. At this point, the sub-image 720 may be associated with the pixels from 401 to 800. Based on the extracted two sub-images 710 and 720, a correlation analysis may be performed. It is to be understood that although the sub-image 710 starts from the first pixel (pixel No. 1) from the left side in the image 410, in another example, the sub-image 720 may start from another pixel such as the second pixel, the third pixel, or another pixel along the horizontal direction of the image 410.

The correlation analysis may be performed according to pixel-based comparison. Continuing the above example, when the size of the area 610 is 1024*200, the sizes of the sub-images 710 and 720 may be defined as 400*200 in the first round. At this point, the pixels in the sub-images 710 and 720 may be compared to determine the correlation. Various methods may be adopted for determining the correlation. In one implementation, the difference between RGB values of corresponding pixels, respectively located in the sub-images 710 and 720, may be used for determining the correlation. In this implementation, the correlation for current period may be represented as a number. The greater the correlation is, the worse the correlation is.

It is to be understood that FIG. 7 is just an example for determining the correlation for the first round where the current period is set to 400. Based on this example, the steps for the second round may be similar as those of the first round. In the second round, the current period may be set to 401 and then the sub-image 710 may be associated with the pixels from 1 to 401, and the sub-image 720 may be associated with the pixels from 402 to 802. Afterwards, the two sub-images 710 and 720 (with the sizes of 401*200) may be compared to determine the correlation for the current period "401." Here, the current period may be gradually increased from 400 to 488, and then the correlation for all the potential current periods may be determined to find a best period that results in the best correlation between the two sub-images 710 and 720. In this implementation, the best period that leads to the lowest correlation value may be selected as the pattern period 414. For example, if the lowest correlation is obtained when the current period is set to 450, then the pattern period 414 may have a value of 450.

Although above paragraphs have provided descriptions as to determining the pattern period 414 along the horizontal direction, in another implementation, the above procedures may be performed along the vertical direction of the image 410.

Having described how to determine the pattern period 414 in the above paragraphs, reference will be made to FIG. 8 for details of determining a defect area in the image 410. In one implementation of the present disclosure, the reference image 420 and the image 410 may be aligned, and then a defect area including a difference may be detected by comparing the aligned reference image 420 and the image 410.

Figure 8:
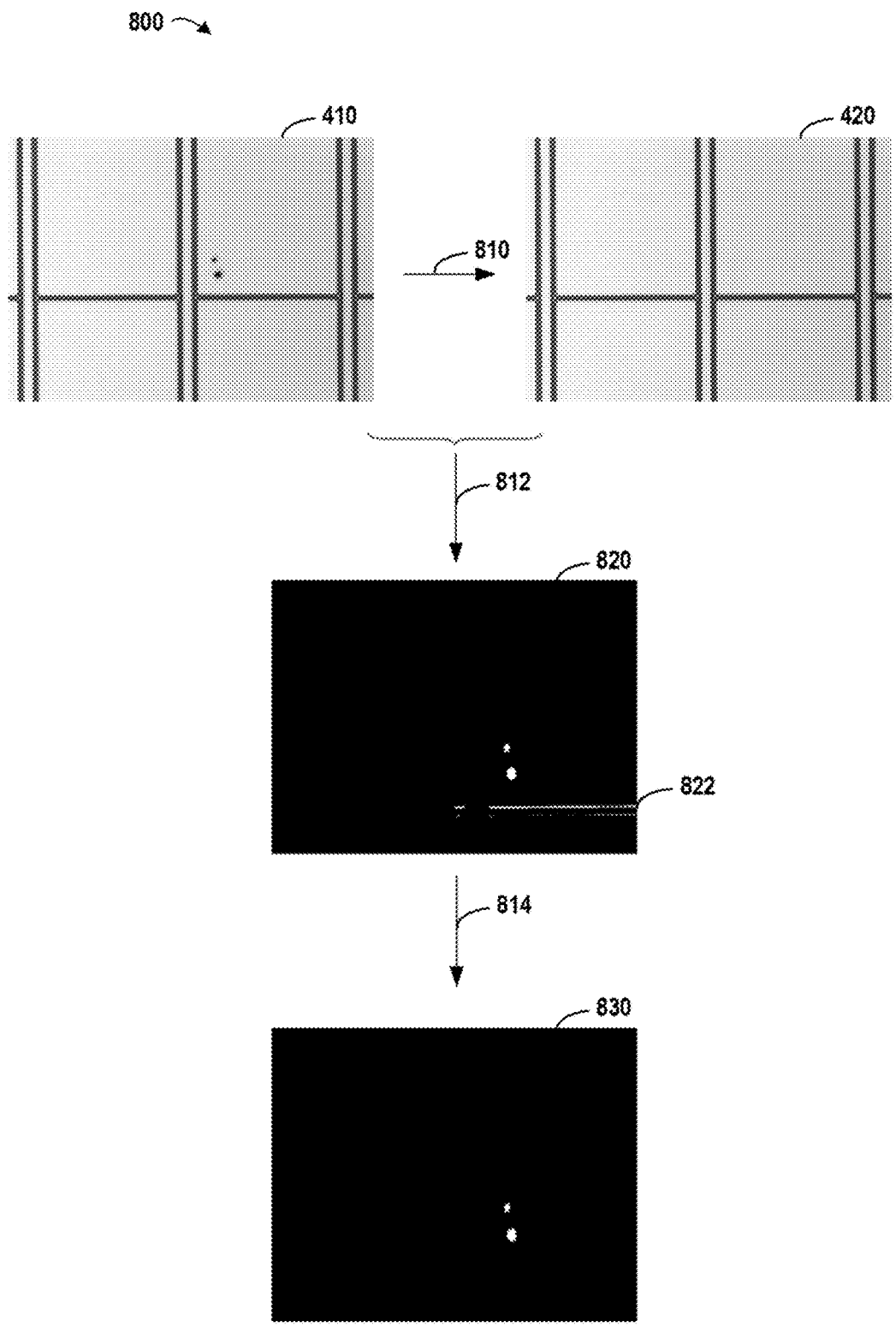
FIG. 8 depicts an example diagram for identifying a difference between an image and a reference image, according to one implementation of the present disclosure.

FIG. 8 depicts an example diagram for identifying a difference between the image 410 and a reference image 420, according to one implementation of the present disclosure. According to FIG. 8, the image 410 may be aligned (as illustrated by an arrow 810) to the reference image 420. After the alignment, the pattern in the image 410 may be overlapped to the pattern in the reference image 420. Accordingly, the image 410 of the to-be-evaluated object may be compared (as illustrated by an arrow 812) with the clean reference image 420 with no defect so as to see if there is any difference in the two images 410 and 420.

Here, a difference between each pair of corresponding pixels in the image 410 and the reference image 420 may be determined, so as to form a difference bitmap 820. In the difference bitmap 820, a pixel in black may indicate that there is no difference between the pair of corresponding pixels located in the image 410 and the reference image 420. However, a pixel in white may indicate that there are differences. For example, the two white dots in the difference bitmap 820 may possibly be caused by defects in the target object. It is to be understood that noises (such as the white line 822 in the difference bitmap 820) may be involved in the above procedure, at this point, digital image processing may be performed (as illustrated by an arrow 814) to the difference bitmap 820 to remove the noise and obtain a final difference bitmap 830. Then, the quality of the target object may be evaluated according to the final difference bitmap 830.

In one implementation of the present disclosure, the quality may be evaluated as "qualified" in response to no defect area having been detected. Continuing the example of FIG. 8, if the pixels in the final difference bitmap 830 are all in black, then it may be determined that there is no defect area. Thereby, the quality of the target object may be evaluated as "qualified." In one implementation, the quality may be evaluated as "unqualified" in response to a defect area having been detected. Referring to FIG. 8, two white dots exist in the final reference bitmap 830, and thus the areas corresponding to these white dots may be considered as the defect areas. It is to be understood that FIG. 8 is only an example illustration for storing the difference between the image 410 and the reference image 420 by the bitmaps 820 and 830. In another implementation, other data structures may be adopted for storing the difference.

The above paragraphs have described how to classify the target object as "qualified" objects or "unqualified" objects. Sometimes, fine classifications may be provided to the "unqualified" objects. In one example, based on whether the target object may be repaired, the "unqualified" objects may be further divided into "repairable" objects and "non-repairable" objects.

In one implementation of the present disclosure, repairability of the target object may be determined based on a location of the defect area in the reference image in response to the defect area having been detected. For details, reference will be made to FIG. 9, which depicts an example diagram 900 for determining repairability of the target object based on a location of the defect area in the reference image 420, according to one implementation of the present disclosure. According to FIG. 9, the location of the defect area 914 may be determined based on a bounding box of the differences 912. Although the differences 912 in FIG. 9 includes two bad points and the defect area 914 is identified as one area with two defects, in another example, two defect areas may be respectively determined from the two bad points.

Usually, the larger the area occupied by the defect is, the less the repairability is. Specifically, if the defect occupies more than one unit (for example, the defect crosses a boundary line of a pattern), usually the defect cannot be repaired. Accordingly, whether the defect area crosses a boundary line of a pattern may be a standard for judging whether the target object may be repaired. In one implementation of the present disclosure, an intersection relationship may be determined, where the interaction relationship indicates whether there is an intersection between the location of the defect area and at least one boundary line of a pattern in the reference image 420. Further, repairability of the target object may be determined based on the intersection relationship. If there are one or more intersections, then the target object may be considered as "non-repairable," otherwise, the target object may be a "repairable" one.

Figure 9:
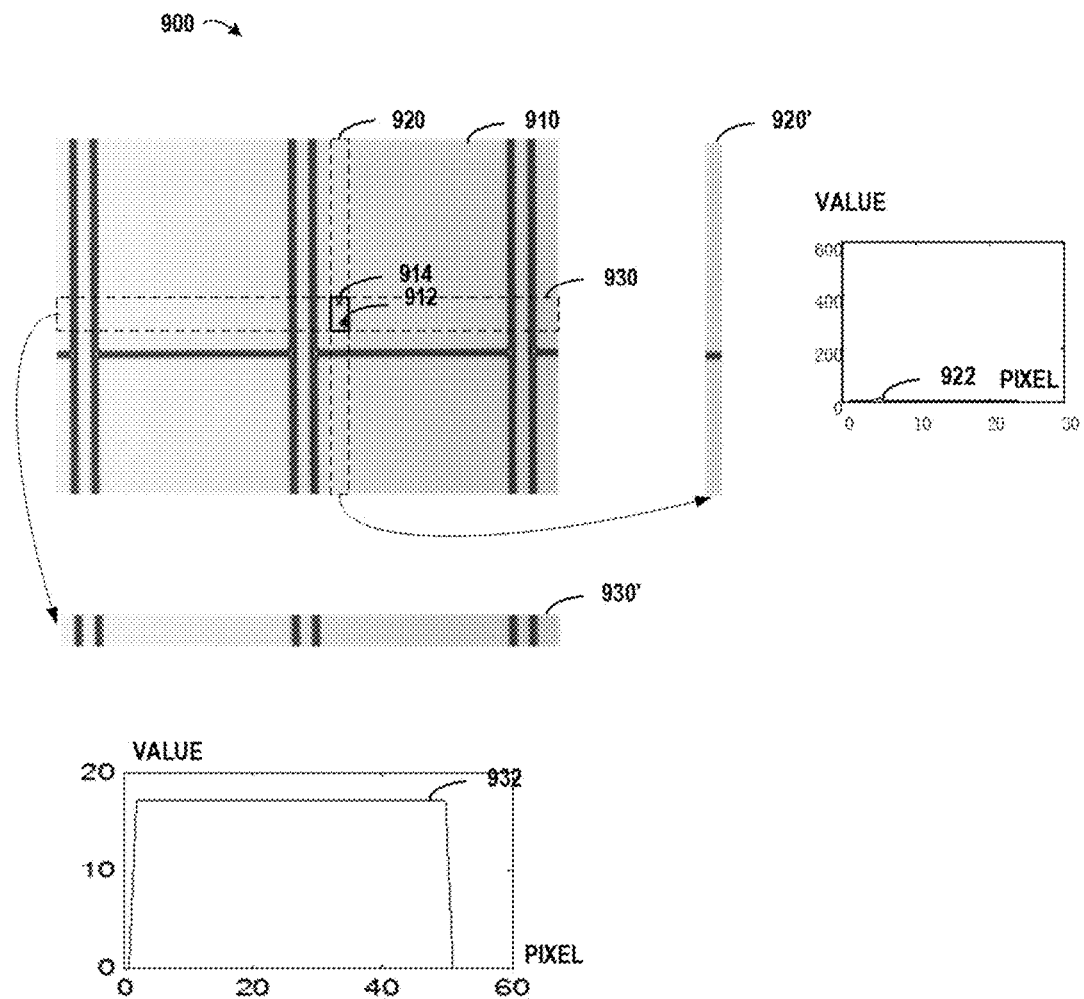
FIG. 9 depicts an example diagram for determining repairability of the target object based on a location of a defect area in the reference image, according to one implementation of the present disclosure.

Reference will be made to FIG. 9 for describing how to determine the quality based on the intersection relationship. FIG. 9 depicts an example diagram 900 for determining repairability of the target object based on a location of the defect area in the reference image according to one implementation of the present disclosure. In one implementation of the present disclosure, with respect to a vertical direction and a horizontal direction of the image, a projection corresponding to the defect area 914 may be determined. If there is a sharp peak in the projection, then it may be determined that the defect area 914 crosses a boundary line along the direction. Otherwise, if there is no intersection along the two directions, then it may be determined that the defect area 914 does not cross any boundary line and thus the defect in the defect area 914 may be repaired.

Reference will be made to FIG. 9 for details of determining the projection. As shown in FIG. 9, along the horizontal direction, a block 920' associated with the defect area 914 may be obtained from the reference image 420. Here, the block 920' may be a vertical block corresponding to the block 920 that includes the defect area 914 and covers the full height of the reference image 420. Then, a projection of the block 920' may be determined at each pixel along the horizontal direction. In other words, the block 920' may be projected to the horizontal direction and a value at a pixel in the projection may indicate accumulated values of pixels in a vertical line crossing the pixel.

The following paragraphs will describe how to determine the projection. Supposing a size of the defect area 914 is 30*60, then a size of the block 920' that is obtained along the horizontal direction may be 30*768. Here, the projection may be an array including 30 values, each of these values may be calculated by accumulated values of pixels in a vertical line crossing the pixel in the block 920'. For the block 920', values in the projection at the pixels from No. 1 to No. 30 will be determined based on the following rules.

With respect to the first pixel (pixel No. 1) in the block 920', the values (such as the RGB values) of each pixel in a vertical line crossing the first pixel may be accumulated. With respect to the second pixel (pixel No. 2) in the block 920', the values of each pixel in a vertical line crossing the second pixel may be accumulated. Based on similar rules, the values for the other pixels may be determined. Based on these values in the projection, a curve 922 may be generated, where the x axis indicates the number of the pixel, and the y axis indicates the values at each pixel.

Here, the block 920' is projected to the horizontal direction, and the curve 922 shows a line shape near the x axis. Based on whether there is a sharp peak in the curve 922, the intersection relationship may be determined. Specifically, if there is a sharp peak, it may be determined that an intersection occurs and the defect area 914 crosses a boundary line of a pattern. In turn, the target object may be identified as "non-repairable." Otherwise, if no sharp peak is detected, it may indicate that the defect area 914 does not cross a vertical boundary line. With regard to the curve 922, no sharp peak occurs.

Further, a block 930' may be determined along the vertical direction. Here, the block 930' may be a horizontal block corresponding to the block 930 that includes the defect area 914 and covers the full width of the reference image 420. Then, similar as that in generating the curve 922, the block 930' may be projected to the vertical direction to generate the curve 932. As the curve 932 contains no sharp peak, it may be determined that no intersection occurs with a horizontal boundary line.

In one implementation of the present disclosure, the quality may be evaluated as "repairable" in response to no sharp peak occurring in projections along any of a vertical and a horizontal direction of the image. According to the above descriptions and FIG. 9, no intersection occurs along any of the vertical and horizontal directions, thereby the defect area 914 crosses no boundary line and thus the defect related to the defect area 914 may be repairable.

Figure 10:
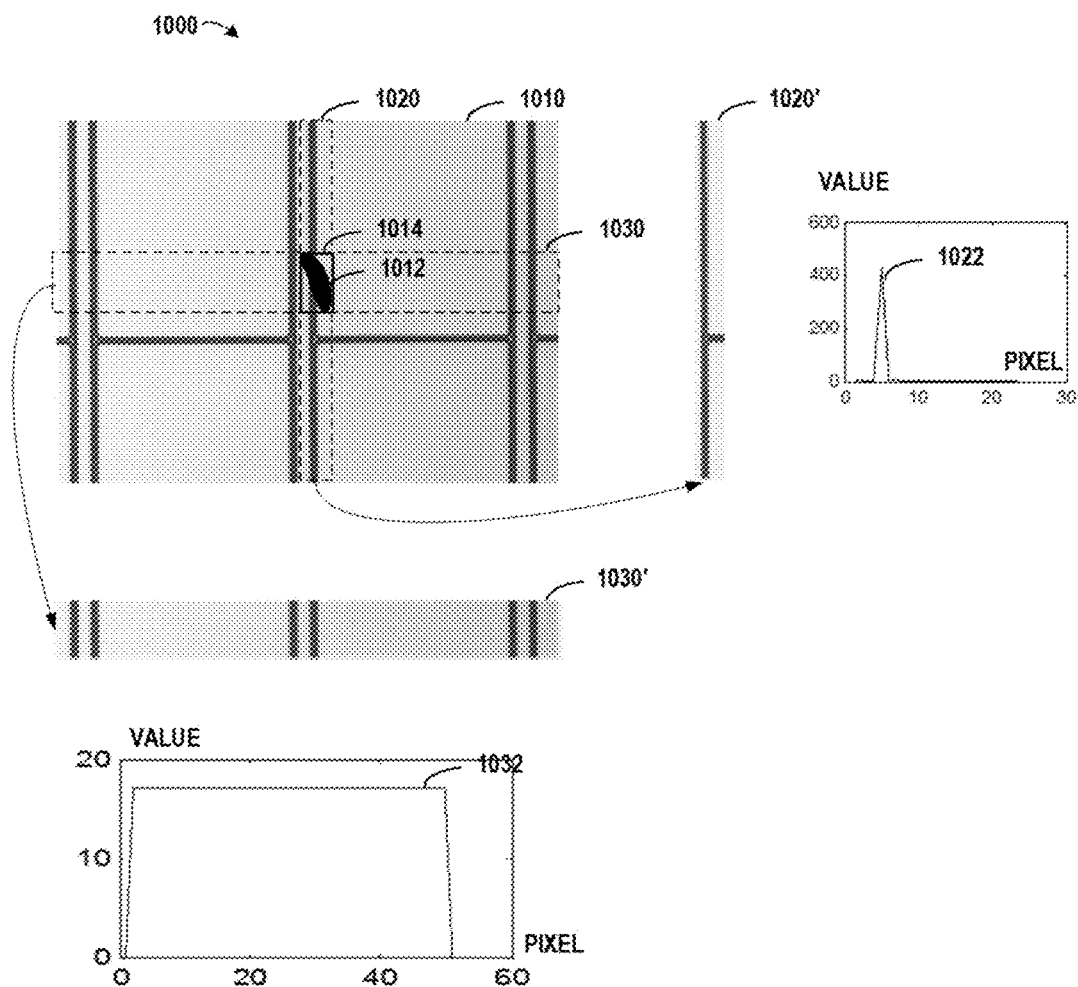
FIG. 10 depicts another example diagram for determining repairability of the target object based on a location of a defect area in the reference image, according to one implementation of the present disclosure.

In one implementation of the present disclosure, the quality may be evaluated as "non-repairable" in response to a peak occurring in a projection along one of a vertical and a horizontal direction of the image 410. Reference will be made to FIG. 10 to describe another example where the defect area crosses a boundary line of a pattern. In FIG. 10, an irregular shape in the defect area 1014 represents a defect 1012 that crosses a vertical boundary line of a pattern. FIG. 10 shows similar processing as that illustrated in FIG. 9, where a vertical block 1020' corresponding to a block 1020 may be determined, and a horizontal block 1030' corresponding to a block 1030 may be determined. Further, a curve 1022 and a curve 1032 may be generated based on respective projections of the vertical block 1020' and the horizontal block 1030', respectively. From FIG. 10, as a sharp peak occurs in the curve 1022 and no sharp peak occurs in the curve 1032, it may be determined that the defect area 1014 crosses a vertical boundary line and thus the target object may be identified as "non-repairable."

In one implementation of the present disclosure, quality of a second target object may be evaluated by comparing the reference image and an image of the second target object, where models of the target object and the second target object are the same. Usually, the target objects with a same model may have the same pattern. For example, with respect to a batch of TFT objects that are manufactured by the same factory with the same model, only one reference image 420 may be generated for evaluating the quality of all the TFT objects in the batch. In this implementation, the procedures for extracting the pattern 414 and the generating the reference image 420 may be omitted.

It is to be understood that the above paragraphs have described example implementations where the defect area 914 crosses no boundary line and the defect area 1014 crosses one boundary line, in other implementations, the defect area may cross more boundary lines. Once the defect area crosses at least one boundary line, the target object may be evaluated as "non-repairable."

Although the "unqualified" objects are classified into "repairable" and "non-repairable" ones in the above paragraphs, in another implementation, more accurate classifications may be provided according to a size and/or a location of the defect area. For example, the "unqualified" objects may be classified into types such as "easy to repair," "hard to repair," "non-repairable," and the like.

Figure 11:
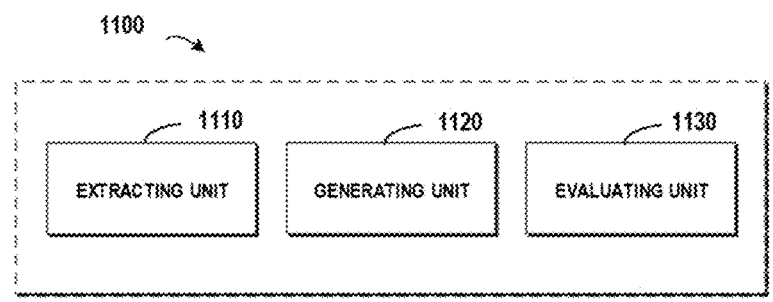
FIG. 11 depicts an example diagram of a system for evaluating quality of a target object, according to one implementation of the present disclosure.

FIG. 11 depicts an example diagram 1100 of a system for evaluating quality of a target object according to one implementation of the present disclosure. According to FIG. 11, an extracting unit 1110 may be provided for extracting a pattern period from an image of a target object, the pattern period indicating a period of a pattern that is repeated in the image. A generating unit 1120 may be provided for generating a reference image by repeating the pattern based on the extracted pattern period. An evaluating unit 1130 may be provided for evaluating quality of the target object by comparing the generated reference image and the image of the target object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    extracting a pattern period from an image of a target object, the pattern period indicating a period of a pattern that is repeated in the image, wherein extracting a pattern period comprises:
        obtaining an initial period by a symmetric analysis to the image; and
        obtaining the pattern period by refining an initial period based on a correlation analysis associated with the initial period, wherein obtaining the pattern period comprises:
            selecting a current period from a range associated with the initial period;
            obtaining a first sub-image and a second sub-image from the image by dividing the image with the current period; and
            identifying the current period as the pattern period in response to a correlation occurring between the first sub-image and the second sub-image;
    generating a reference image by repeating the pattern based on the pattern period; and
    evaluating quality of the target object by comparing the reference image and the image of the target object.

2. The computer-implemented method of claim 1, wherein the evaluating quality of the target object comprises:
    aligning the reference image and the image;
    detecting a defect area including a difference by comparing the aligned reference image and the image; and
    evaluating the quality of the target object as qualified, in response to not detecting the defect area.

3. The computer-implemented method of claim 2, wherein the quality comprises repairability of the target object, and evaluating the quality of the target object further comprises:
    determining repairability of the target object based on a location of the defect area in the reference image, in response to detecting the defect area.

4. The computer-implemented method of claim 3, wherein determining the repairability of the target object comprises:
    detecting an intersection relationship between the location of the defect area and at least one boundary line of a reference pattern in the reference image; and
    determining repairability of the target object based on the intersection relationship.

5. The computer-implemented method of claim 4, wherein detecting the intersection relationship, further comprises:
    obtaining, from the reference image, a block corresponding to the defect area along a direction with respect to a vertical direction and a horizontal direction of the image;
    determining a projection of the block at one or more pixels along the direction, a value at the one or more pixels in the projection indicating accumulated values of the one or more pixels in a line crossing the one or more pixels along another direction of the vertical direction and the horizontal direction of the image; and
    determining the intersection relationship based on whether a peak occurs in the projection.

6. The computer-implemented method of claim 5, wherein determining repairability of the target object based on the intersection relationship further comprises:

evaluating the quality of the target object as repairable in response to no peak occurring in the projection along the vertical direction and the horizontal direction of the image; or evaluating the quality of the target object as non-repairable in response to the peak occurring in the projection along one of the vertical direction and the horizontal direction of the image.

7. The computer-implemented method of claim 1, further comprising:

evaluating the quality of a second image of a second target object by comparing the reference image and the second image of the second target object, wherein models of the target object and the second target object are the same.

8. A computer-implemented system, comprising a computer processor coupled to a computer-readable memory unit, the memory unit comprising instructions that when executed by the computer processor implements a method comprising:

extracting a pattern period from an image of a target object, the pattern period indicating a period of a pattern that is repeated in the image, wherein extracting a pattern period comprises:

obtaining an initial period by a symmetric analysis to the image; and obtaining the pattern period by refining an initial period based on a correlation analysis associated with the initial period, wherein obtaining the pattern period comprises:

selecting a current period from a range associated with the initial period;

obtaining a first sub-image and a second sub-image from the image by dividing the image with the current period; and identifying the current period as the pattern period in response to a correlation occurring between the first sub-image and the second sub-image;

generating a reference image by repeating the pattern based on the pattern period; and evaluating quality of the target object by comparing the reference image and the image of the target object.

9. The computer-implemented system of claim 8, wherein the evaluating quality of the target object comprises:

aligning the reference image and the image;

detecting a defect area including a difference by comparing the aligned reference image and the image; and evaluating the quality of the target object as qualified, in response to not detecting the defect area.

10. The computer-implemented system of claim 9, wherein the quality comprises repairability of the target object, and evaluating the quality of the target object further comprises:

determining repairability of the target object based on a location of the defect area in the reference image, in response to detecting the defect area.

11. The computer-implemented system of claim 10, wherein determining the repairability of the target object comprises:

detecting an intersection relationship between the location of the defect area and at least one boundary line of a reference pattern in the reference image; and determining repairability of the target object based on the intersection relationship.

12. The computer-implemented system of claim 11, wherein detecting the intersection relationship, further comprises:

obtaining, from the reference image, a block corresponding to the defect area along a direction with respect to a vertical direction and a horizontal direction of the image;

determining a projection of the block at one or more pixels along the direction, a value at the one or more pixels in the projection indicating accumulated values of the one or more pixels in a line crossing the one or more pixels along another direction of the vertical direction and the horizontal direction of the image; and determining the intersection relationship based on whether a peak occurs in the projection.

13. The computer-implemented system of claim 8, wherein the method further comprises:

evaluating the quality of a second image of a second target object by comparing the reference image and the second image of the second target object, wherein models of the target object and the second target object are the same.

14. A computer program product, the computer program product comprising a computer readable storage medium having program instructions embodied therewith, the program instructions executable by an electronic device to cause the electronic device to perform actions of:

extracting a pattern period from an image of a target object, the pattern period indicating a period of a pattern that is repeated in the image, wherein extracting a pattern period comprises:

obtaining an initial period by a symmetric analysis to the image; and obtaining the pattern period by refining an initial period based on a correlation analysis associated with the initial period, wherein obtaining the pattern period comprises:

selecting a current period from a range associated with the initial period;

obtaining a first sub-image and a second sub-image from the image by dividing the image with the current period; and identifying the current period as the pattern period in response to a correlation occurring between the first sub-image and the second sub-image;

generating a reference image by repeating the pattern based on the pattern period; and evaluating quality of the target object by comparing the reference image and the image of the target object.

* * * * *